(12) United States Patent
Nishimura et al.

(10) Patent No.: US 7,704,642 B2
(45) Date of Patent: Apr. 27, 2010

(54) CATIONIC CONDUCTOR, ITS INTERMEDIATE, AND LITHIUM SECONDARY BATTERY USING THE CONDUCTOR

(75) Inventors: Shin Nishimura, Hitachi (JP); Akira Satou, Naka (JP); Takefumi Okumura, Hitachi (JP); Makoto Morishima, Hitachinaka (JP); Hitoshi Yamamoto, Minoo (JP); Norikazu Ueyama, Osaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/933,507

(22) Filed: Nov. 1, 2007

(65) Prior Publication Data

US 2008/0187839 A1    Aug. 7, 2008

Related U.S. Application Data

(62) Division of application No. 10/392,921, filed on Mar. 21, 2003, now Pat. No. 7,300,991.

(30) Foreign Application Priority Data

Mar. 27, 2002    (JP) .............................. 2002-087355

(51) Int. Cl.
    *H01M 6/18* (2006.01)
(52) U.S. Cl. .................. 429/314; 429/304; 429/306
(58) Field of Classification Search ................ 429/304, 429/306, 314
    See application file for complete search history.

(56) References Cited

U.S. PATENT DOCUMENTS

| 4,898,915 A | 2/1990 | Harwood et al. |
| 5,457,172 A | 10/1995 | Curci et al. |
| 5,874,184 A * | 2/1999 | Takeuchi et al. ............ 429/314 |
| 6,624,262 B2 | 9/2003 | Matyjaszewski et al. |

FOREIGN PATENT DOCUMENTS

| EP | 1098382 | 5/2001 |
| GB | 2119162 | 11/1983 |

(Continued)

OTHER PUBLICATIONS

European Search Report dated Jul. 24, 2003 for EP No. 03 00 6827.

(Continued)

*Primary Examiner*—Dan-Wei D Yuan
*Assistant Examiner*—Zachary Best
(74) *Attorney, Agent, or Firm*—Antonelli, Terry, Stout & Kraus, LLP.

(57) ABSTRACT

The disclosure discloses a polymer represented by the general formula,

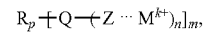

wherein $R_p$ is a residue of a polymer of a compound having a polymerizable unsaturated bond, Q is an organic residue of n+1 valences and connected directly or through another group to $R_p$ by means of a single bond, $M^{k+}$ is a cation of k valence, Z is an organic function group capable of forming an ionic bond with cation $M^{k+}$ or an organic function group having a coordination capability with $M^{k+}$, and m, n and k are integers of one or more. The disclosure also discloses an intermediate of the polymer mentioned above.

16 Claims, 2 Drawing Sheets

FOREIGN PATENT DOCUMENTS

| JP | 01-309213 | 12/1989 |
|---|---|---|
| JP | 2000-123632 | 4/2000 |
| JP | 2002-317058 | 10/2002 |

OTHER PUBLICATIONS

Xie, et al., "Ionic Conductivity of a Novel Solid Polymer Electrolyte", *Journal of Applied Polymer Science*, vol. 80, 2001, pp. 2176-2184.

Meyer, et al., "Polymer Electrolytes for Lithium-Ion Batteries", *Advanced Materials*, vol. 10, No. 6, 1998, pp. 439-448.

H. Yamamoto, et al., "Intramolecular NH••O hydrogen bond in anion state of 2,6-dihydroxy benzamide derivative", Annual Conference of the Japan Chemical Society held Mar. 26-29, 2002, (3 B2-34).

G. Wehr, et al., "Polymere N-Acylaminohydrochinone", *Die Makromolekulare Chemie*, 175, pp. 3133-3146 (1974).

Japanese Official Action mailed Oct. 30, 2007, for Application No. 2003-081712.

*Encyclopedia of New High Polymers*, The Society of Polymer Science, Japan, Sep. 20, 1988, pp. 206-207.

\* cited by examiner

CATIONIC CONDUCTOR, ITS INTERMEDIATE, AND LITHIUM SECONDARY BATTERY USING THE CONDUCTOR

This application is a Divisional application of application Ser. No. 10/392,921, filed Mar. 21, 2003, now U.S. Pat. No. 7,300,991 the contents of which are incorporated herein by reference in their entirety.

DESCRIPTION OF THE INVENTION

1. Field of the Invention

The present invention relates to an ionic conductive organic electrolyte and a polymer electrolyte.

2. Prior Art

As the progress of electronic technology, performance of electronic devices has increased to make small sizes of them and make them potable, and then secondary batteries having high energy density for power sources of the devices are desired.

In responding to this demand, lithium ion secondary batteries with an organic electrolyte solution (hereinafter referred to as lithium battery) that have remarkably increased energy density have been developed and used widely.

In general, lithium batteries use as positive active material a lithium metal complex oxide such as lithium cobalt composite oxide, for example, and as a negative active material a carbon material that is capable of inserting lithium ions into intercalation of the carbon material (i. e. formation of lithium intercalation compound) and of releasing lithium ions from the intercalation.

As lithium batteries use as an electrolyte an inflammable organic electrolyte, it is becoming difficult to secure safety of the batteries as the energy density increases, when they are subjected to such heavy duty as overcharge and overdischarge. Then, lithium batteries that have lithium ion conductive solid polymers have developed, instead of the inflammable organic electrolyte solution.

Among the lithium ionic conductive solid polymers for the polymer electrolytes, polyethylene oxide is a typical one. The possibility of polyethylene oxide as a lithium ionic conductive solid electrolyte is pointed out by Almand, et al in "First Ion Transport in Solids", pp. 131, Eselvier, New York, 1979.

There are many improvements of the polymers and investigations on other polymers. At present, an ionic conductive polymer that exhibits the highest ionic conductivity is a copolymer of branched ethylene oxide and propylene oxide as disclosed in Japanese Patent Laid-open 2000-123632. The ionic conductivity is about $10^{-4}$ Scm$^{-1}$.

DESCRIPTION OF THE INVENTION

In the ionic conductive polymers that have been investigated heretofore, ion conductivity takes place jointly with molecular motion of the polymer. That is, functional groups having coordinating capability present in the polymer chain make coordination to lithium ions, whereby lithium ions can move to other coordination groups by transition along with motion of molecular chains. Therefore, the ionic conductivity depends on mobility of the molecular chains, and also depends on a motion necessary for conformation change of a main chain such as dihedral angle motion that needs large activation energy. When a temperature is low where the molecular motion is suppressed, ionic conductivity decreases at the same time.

The inventors have devised to employ as a mechanism for transferring ions by the rotation of a single bond in a molecular chain that has small activation energy and that does not depend on motion of a molecular chain. In a compound, an organic compound having functional groups that can become coordination groups or ligands to lithium ions are bonded to other organic groups, whereby the single bond can rotate freely over the wide range of temperature. Exchange of lithium ions between adjoining similar or analogous functional groups takes place by the action of the rotation. This phenomenon brings about ionic conductivity.

Another manner was devised by the inventors. The structure of organic groups having functional groups to be ligands of lithium ions that are connected by means of the single bond was provided with such functional groups as amide groups. The groups form hydrogen bonds having stable stereo structure with ligands, and the pKa of the functional groups to be ligands was changed to control coordination capability of lithium ions.

As a result, transition of lithium ions is accelerated from the functional groups of lower coordination capability to functional groups of higher coordination groups. When employing this mechanism, higher ionic conductivity is obtained even at such a low temperature that segmental motion of the polymer is suppressed.

Figure 2:
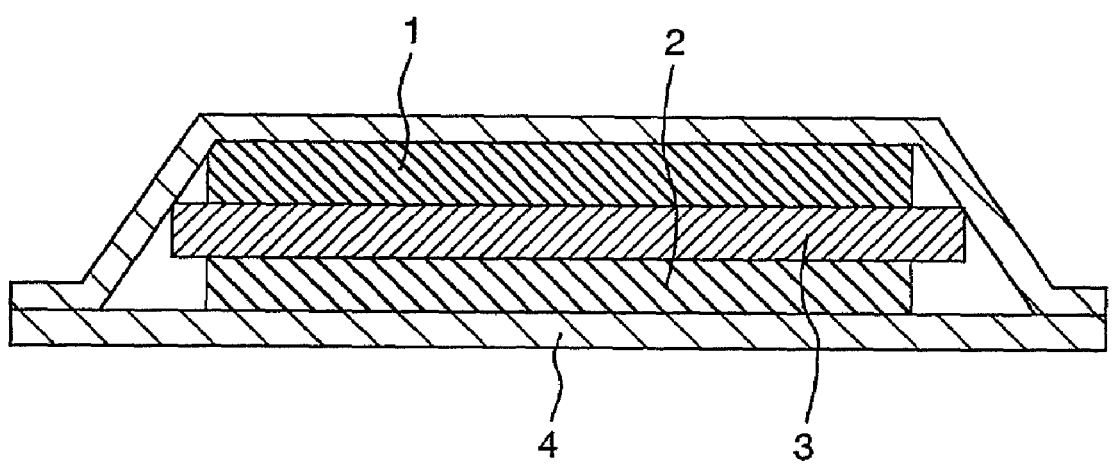
FIG. 2 shows a sectional view of a lithium battery that uses the polymer electrolyte obtained in the procedure described later.

The lithium-ion conductive polymer electrolyte of the present invention shown in FIG. 2 comprises polymer and lithium salt. The polymer electrolyte can be prepared by polymerizing monomer in the presence of the lithium salt both of them being dissolved in an organic solvent, followed by removing the solvent. The polymer electrolyte can be prepared by adding the lithium salt to the polymer solution dissolved in an organic solvent, followed by removing the solvent.

The form of the polymer electrolyte is a sheet form when it is used as an electrolyte of a lithium battery. The sheet also works as a separator between anode and cathode electrodes. The sheet polymer electrolyte is prepared by casting a solution of a monomer and a lithium salt on polytetrafluoroethylene (PTFE) sheet. Then, the monomer is polymerized by heating addition polymerization, polyaddition polymerization, polycondensation polymerization, etc, followed by removing the solvent.

The sheet polymer electrolyte can also be prepared by casting a solution comprising a polymer and a lithium salt on the PTFE sheet, followed by removing the solvent.

Organic solvents for dissolving the polymers and lithium salts are NMP, dimethylformamide, toluene, etc. which can solve the lithium salts and do not react with the polymer.

The battery shown in FIG. 2 is assembled in a casing 4 in such a manner that the polymer electrolyte sheet 3 is sandwiched between an anode 2 made of active material and a cathode 1 made of active material.

In order to make an intimate contact between the anode and the sheet electrolyte and between the cathode and the sheet electrolyte, an anode and cathode that comprise the polymer electrolyte are preferable. In this case, a monomer containing lithium salt dissolved in an organic solvent is polymerized by heating on the anode and/or cathode. A solution in which the polymer and lithium salt are dissolved in an organic solvent is cast on the anode and/or cathode, followed by removing the solvent.

Detailed Description of the Preferred Embodiments

The present invention will be described in detail by way of examples.

The polymer according to the present invention is represented by the general formula,

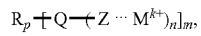

wherein $R_p$ is a residue of a polymer of a compound having a polymerizable unsaturated bond, Q is an organic residue of n+1 valences and connected directly or through another group to $R_p$ by means of a single bond, $M^{k+}$ is a cation of k valence, Z is an organic function group capable of forming an ionic bond with cation $M^{k+}$ or an organic function group having a coordination capability with $M^{k+}$, and m, n and k are integers of one or more.

The intermediate of the polymer defined above is represented by the general formula (I):

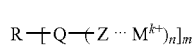

wherein R is a residue of a compound having a polymerizable unsaturated bond, and Q, Z, $M^{k+}$.m, n and k are the same as defined above.

The formula I represents a salt, wherein R is an organic group of an m valence, Q is an organic group of an n+1 valence, Z is an anionic residue of one valence, $M^+$ is a cation of one valence, n and m are integers of 1 or more. The group Q having an anionic residue Z is bonded to the group R by a single bond. The single bond can freely rotate in the molecule so that the salt exhibits cationic conductivity by the action of exchanging each other cations $M^{k+}$ coordinated on the anionic residue Z.

In the formula I, the group R may have functional groups that can be polymerizable. Further, the polymerizable functional groups are unsaturated bonds that are addition-polymerizable. The group R may be a polymer of organic group having addition polymerizable unsaturated bonds. The group Q in formula I may be an aryl group. Further, in formula I, the group Q is an aryl group, Z– may be a hydroxyl residue, and M+ may be lithium ions.

The formula of the polymer encompasses the compounds (2), (3) and (4) shown below:

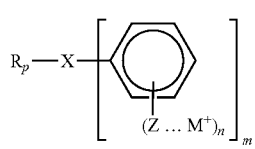

wherein $R_p$ is an organic group of an m valences is an integer of 1 or 2, X is an organic group and m is an integer of 1 or more.

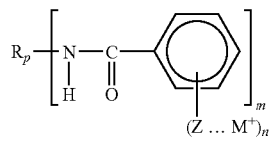

wherein $R_p$ is an organic group of an m valences is an integer of 1 or 2, and m is an integer of 1 or more.

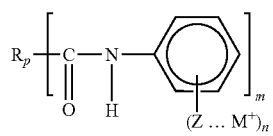

wherein $R_p$ and m are as defined previously.

The organic group R is not limited in the present invention; there are, for example, saturated hydrocarbons, unsaturated hydrocarbons, aromatic hydrocarbons, etc. The group may contain not only pure hydrocarbons, but also groups of hydrocarbons substituted with nitrogen, sulfur, oxygen atom, halogen atoms. Molecular weight of the groups is not limited; there are low molecular weight compounds to high molecular weight compounds. The high molecular weight compounds may be polymers of low or high molecular weight monomers.

The number of substitutes of the organic group Q is not limited; the number of one or more per one molecule is sufficient. When the group R is the polymer, the number may be that corresponding to the degree of polymerization. Further, several kinds of polymerizable monomers may be used to substitute the group Z. Methods of polymerization are not limited; for example, addition polymerization, addition polyaddition, polycondensation, etc. may be employed.

The group Z is a group having a function capable of coordinating cations thereon; when the group Z is oxygen (O$^-$), the group Q may be phenolate anions such as hydroxylphenyl group, dihydroxylphenyl group, etc.

When the functional group Z is methoxy group (—OCH$_3$), there are alkoxyphenyl groups such as methoxyphenyl, dimethoxyphenyl, etc. However, the functional groups should be methoxy group and ethoxy group as alkoxy group. If the number of carbon atoms is too large, it may interfere the rotation of the single bond or it may adverse affect on the solubility of the cationic conductor to make worse workability of the material.

Other groups of which oxygen is substituted with sulfur, such as thiophenyl group or dithiophenyl group may be employed. Other functional groups may be ester(-O—C(=O)—R$^6$, —C(=O)—R$^7$), amino group (—NR$_1$R$_2$), acyl group(—C(=O)—R$^8$), carbonate group(—O—C(=O)—OR$^9$), etc. R$^6$—R$^9$ are all alkyl groups.

The functional groups must be bonded by a single bond to the group R. Among the various compounds, the most preferable compounds are the group R is bonded to the group Q through an amide bond.

Cations used in the present invention include ions of alkali metals such as lithium, sodium, potassium and ions of alkaline earth metals such as magnesium, etc. Among the above ions lithium ions are most preferable.

The lithium ion conductive polymer of the present invention can be used as a separator, as well as an electrolyte. The polymer functions as electrolyte and separator. The polymer is formed in sheet of a thickness of several micrometers. The polymer can also be used as an anode to which positive active materials are added for lithium ion batteries.

In lithium batteries, positive active materials are $LiCoO_2$, $LiNiO_2$, $Li_{1+x}Mn_{2-x}O_4$ (x=0~0.33), $Li_{1+x}Mn_{2-x-y}M_yO_4$ (M is a metal which is selected from Ni, Co, Cr, Cu, Fe, Al, Mg, x=0~0.33, y=0~1.0, 2-x-y>0), $TiS_2$, $MoS_2$, $V_6O_{12}$, VSe, $NiPS_2$, polyaniline, polypyrrole, polythiophene, etc.

Negative active materials are graphite or carbon in which lithium ions are intercalated in the lamellar structure, lithium metal, lithium-lead alloy, etc.

Description of the Preferred Embodiments

EXAMPLE 1

232 Grams of salicylic acid and 283 grams of 1-hydroxybenzotriazole were completely dissolved in a mixed solvent consisting of 3 $dm^3$ of tetrahydrofuran and 2.5 $dm^3$ of N,N'-dimethylformamide, the solvent having been dried by evaporation. The solution was stirred at room temperature for 30 minutes.

The solution was then cooled to zero ° C., and 287 grams of 1-[3-(dimethylamino)propyl]-3-ethylcarbodiimide was dropped in the solution, followed by stirring at zero ° C. for 30 minutes. To the solution slowly dropped was 2 $dm^3$ of tetrahydrofuran containing 245 grams of vinylaniline and cooled to zero ° C., followed by stirring the solution at room temperature for 2 days.

The reaction solution was condensed to extract an ethyl acetate phase from ethyl acetate and hydrochloric acid of 2 normals. The extract was rinsed with hydrochloric acid and saturated sodium chloride solution and drying with sodium sulfate, followed by condensation and purification to obtain white powdery solid.

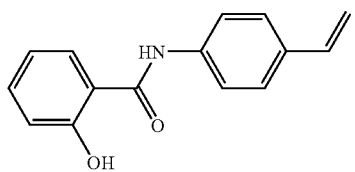

Intermediate I; N-(4-vinyl phenyl)-2-hydroxy-benzoic amide

50 Grams of the resulting solid was completely dissolved in 1 dm3 of tetrahydrofuran, and 46 $cm^3$ of 10M n-hexane solution of butyl lithium was dropped in the solution, followed by stirring. The solution was condensed and the resulting substance was cast on a sheet of polytetrafluoroethylene. The film was dried under reduced pressure at room temperature to produce a cast film having a thickness of 100 micrometers.

The cast film was sandwiched between electrodes made of stainless steel (SUS 304) each having a diameter of 15 mm to obtain a cell for evaluation.

An amplitude voltage of 10 mV was applied to the cell at room temperature to measure a. c. impedance. A frequency range was from 1 Hz to 1 MHz. An ionic conductivity was derived from the reciprocal number of the bulk ohmic value that was obtained from measurement of the a. c. impedance. The ionic conductivity was $5 \times 10^{-4}$ $Scm^{-1}$, which was larger than that of the solid electrolyte made of polyethyleneoxide.

EXAMPLE 2

259 Grams of dihydroxybenzoic acid and 283 grams of 1-hydroxybenzotriazole were completely dissolved in a mixed solvent consisting of 3 $dm^3$ of tetrahydrofuran and 2.5 $dm^3$ of N,N'-dimethylformamide, the solvent having been dried by evaporation. The solution was stirred at room temperature for 30 minutes.

The solution was then cooled to zero ° C., and 287 grams of 1-[3-(dimethylamino)propyl]-3-ethylcarbodiimide was dropped in the solution, followed by stirring at zero ° C. for 30 minutes. To the solution slowly dropped was 2 dm3 of tetrahydrofuran containing 245 grams of vinylaniline and cooled to zero ° C., followed by stirring the solution at room temperature for 2 days.

The reaction solution was condensed to extract an ethyl acetate phase from ethyl acetate and hydrochloric acid of 2 normals. The extract was rinsed with hydrochloric acid and saturated sodium chloride solution and drying with sodium sulfate, followed by condensation and purification to obtain white powdery solid.

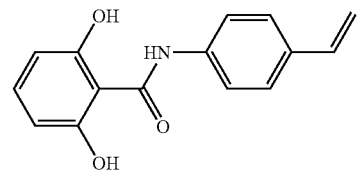

Intermediate II; N-(4-vinyl phenyl)-2,6-dihydroxy-benzoic amide

50 Grams of the resulting solid was completely dissolved in 1 $dm^3$ of tetrahydrofuran, and 46 $cm^3$ of 10M n-hexane solution of butyl lithium was dropped in the solution, followed by stirring. The solution was condensed and the resulting substance was cast on a sheet of polytetrafluoroethylene. The film was dried under reduced pressure at room temperature to produce a cast film having a thickness of 100 micrometers.

The cast film was sandwiched between electrodes made of stainless steel (SUS 304) each having a diameter of 15 mm to obtain a cell for evaluation.

An amplitude voltage of 10 mV was applied to the cell at room temperature to measure a.c. impedance. A frequency range was from 1 Hz to 1 MHz. An ionic conductivity was derived from the reciprocal number of the bulk ohmic value that was obtained from measurement of the a.c. impedance. The ionic conductivity was $4 \times 10^{-4}$ $Scm^{-1}$, which was larger than that of the solid electrolyte made of polyethyleneoxide.

EXAMPLE 3

356 Grams of 2,6-dimethoxybenzoic acid was completely dissolved in 1 dm3 of vaporization-dried N-methyl pyrrolidone. To the solution added were 280 ml of triethylamine, 805 grams of (2,3-dihydro-2-thioxo-3-benzolyl)phosphonate and 260 ml of aminostyrene. The solution was stirred at room temperature for one day. The reaction solution was dropped in 8 dm3 of aqueous solution of 1% sodium hydrogencarbonate, and then the solution was stirred. The precipitated solid was purified with ethylacetate/n-hexane to obtain solid.

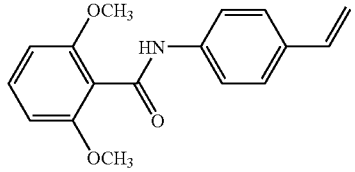

Intermediate III; N-(4-vinylphenyl)-2,6-dimethoxy benzoic amide

140 Grams of the resulting solid was completely dissolved in 5 dm3 of tetrahydrofuran, and then 0.4 gram of azobisisobutylonitrile was added. The solution was stirred at 65° C. The reaction solution was dropped in 10 dm$^3$ of n-hexane to obtain polymer. 50 Grams of the polymer was completely dissolved in 2 dm$^3$ of N-methyl pyrrolidone, and then 98 grams of lithium trisulfoneimide was added to the polymer solution and the solution was stirred. The polymer solution was cast on polytetrafluoroethylene sheet and the cast film was dried at 60° C. in vacuum to obtain cast film of 100 μm thick.

The cast film was sandwiched between a pair of stainless electrodes (SUS304) of 15 mm diameter to prepare a cell for evaluation. A.C. current of amplitude of 10 mV was applied to the cell at room temperature to measure A.C. impedance. The range of frequency was from 1 Hz to 1 MHz. An ionic conductivity was determined from an inverse of a bulk resistance obtained from the A.C. impedance. The ionic conductivity was $1.4 \times 10^{-4}$ Scm$^{-1}$, which was almost the same as that of the solid electrolyte that used polyethylene oxide.

Figure 1:
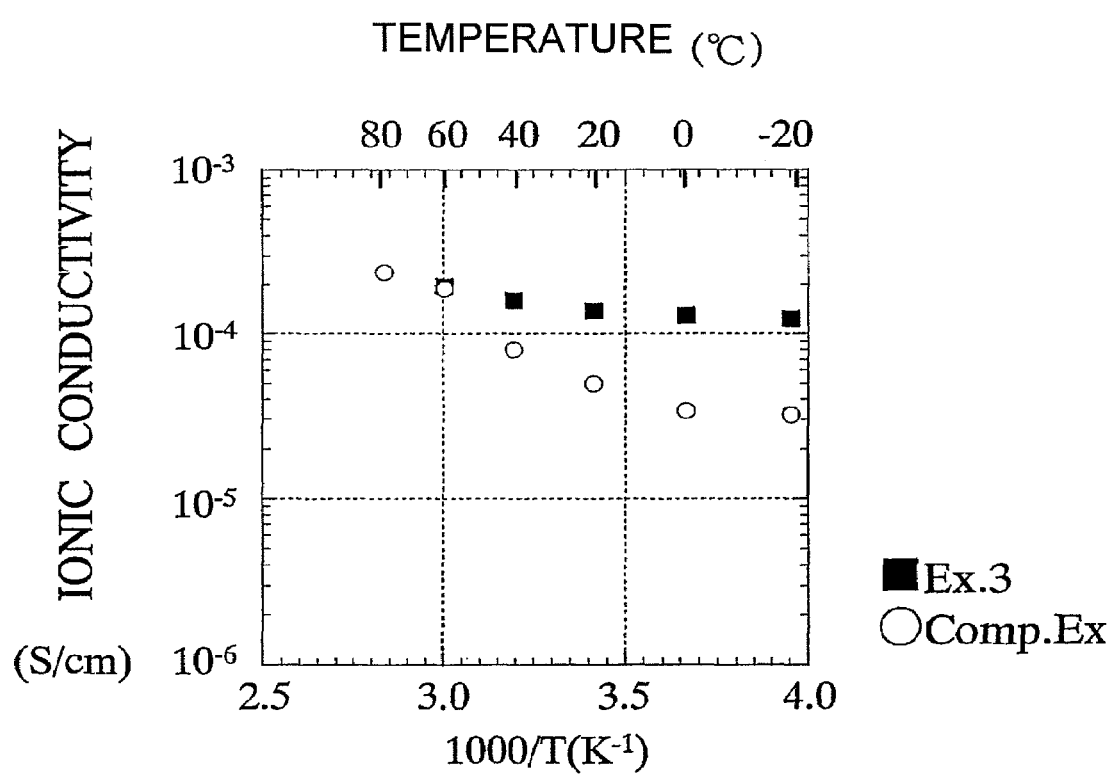
FIG. 1 shows a graph that shows relationship between ionic conductivity of the polymer electrolyte and temperatures.

In FIG. 2 there is shown a sectional view of a lithium battery that uses the polymer electrolyte obtained in the above procedure. In FIG. 1 there is shown a graph that shows relationship between ionic conductivity of the polymer electrolyte and temperatures.

The electrolyte obtained in this example exhibits a very small temperature coefficient, compared to one obtained in Comparative Ex. That is, the coefficient of the electrolyte of Example 3 at −20° C. is almost the same as that at room temperature.

However, the electrolyte obtained in comparative 2 shows a temperature coefficient change resulting in that ionic conductivity decreases in the order level as the temperature increases. Therefore, the electrolyte of the present invention exhibits much better ionic conductivity than the comparative polymer electrolyte.

EXAMPLE 4

356 Grams of 2,6-dimethoxybenzoic acid was completely dissolved in 1 dm3 of vaporization-dried N-methyl pyrrolidone. To the solution added were 280 ml of triethylamine, 805 grams of (2,3-dihydro-2-thioxo-3-benzolyl)phosphonate and 260 ml of aminostyrene. The solution was stirred at room temperature for one day. The reaction solution was dropped in 8 dm3 of aqueous solution of 1% sodium hydrogencarbonate, and then the solution was stirred. The precipitated solid was purified with ethylacetate/n-hexane to obtain solid.

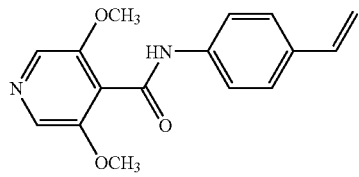

Intermediate IV; N-(4-vinylphenyl)-3,5-dimethoxy isonicotinamide

140 Grams of the resulting solid was completely dissolved in 5 dm3 of tetrahydrofuran, and then 0.4 gram of azobisisobutylonitrile was added. The solution was stirred at 65° C. The reaction solution was dropped in 10 dm$^3$ of n-hexane to obtain polymer. 50 Grams of the polymer was completely dissolved in 2 dm$^3$ of N-methyl pyrrolidone, and then 98 grams of lithium trisulfoneimide was added to the polymer solution and the solution was stirred. The polymer solution was cast on polytetrafluoroethylene sheet and the cast film was dried at 60° C. in vacuum to obtain cast film of 100 μm thick.

The cast film was sandwiched between a pair of stainless steel electrodes (SUS304) of 15 mm diameter to prepare a cell for evaluation. A.C. current of amplitude of 10 mV was applied to the cell at room temperature to measure A.C. impedance. The range of frequency was from 1 Hz to 1 MHz. An ionic conductivity was determined from an inverse of a bulk resistance obtained from the A.C. impedance. The ionic conductivity was almost the same as that of the solid electrolyte that used polyethylene oxide.

EXAMPLE 5

183 Grams of 2,6-dimethoxybenzoicacid was completely dissolved in 500 ml of N-methylpyrrolidone that was evaporation-dried. Then, 140 ml of triethylamine and 403 grams of (2,3-dihydro-2-thioxo-3-benzolyl)phosphonate were added to the solution.

The solution was added to 434 grams of tris(2-aminoethyl) amine that was dissolved in 500 ml of N-methylpyrrolidone, while cooling the solution. The solution was stirred at room temperature for two days. The reaction solution was dropped in 10 dm$^3$ of aqueous solution of 2% sodium hydrogencarbonate, and the solution was stirred. The precipitate was extracted with ethylacetate/n-hexane to obtain a solid.

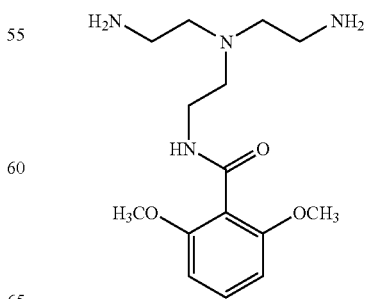

Intermediate V; N-(di(2-aminoethyl)aminoethyl)-2,6-dimethoxybenzoic amide 1.5 dm³ of carbon tetrachloride containing 183 grams of adipic acid dichloride was added to 1.5 dm³ of aqueous solution in which 160 grams of the solid and 40 grams of sodium hydroxide were dissolved, while stirring, thereby to precipitate polymer. 50 Grams of the resulting polymer was dissolved in 2 dm3 of phenol, and then 58 grams of lithium trifluorosulfoneimide was added to the solution under stirring.

Then, the solution was cast on polytetrafluoroethylene sheet, and the cast film was dried under vacuum at 60° C. to obtain cast film of 100. µm thick. The cast film was sandwiched between a pair of stainless steel electrodes (SUS304) of 15 mm diameter to prepare a cell for evaluation.

A.C. current of amplitude of 10 mV was applied to the cell at room temperature to measure an A.C. impedance. The range of frequency was from 1 Hz to 1 MHz. An ionic conductivity was determined from an inverse of a bulk resistance obtained from the A.C. impedance. The ionic conductivity was almost the same as that of the solid electrolyte that used polyethylene oxide.

EXAMPLE 6

148 Grams of 4-vinylbenzoicacid and 160 grams of 1-hydroxybenzotriazole were completely dissolved in a mixed solvent consisting of 2 dm3 of tetrahydrofuran and 1.5 dm³ of N,N'-dimethylformamide, and the solution was stirred at room temperature for 30 minutes. The solution was cooled to 0° C., and then 171 grams of 1-[3-(dimethylamino)propyl]-3-ethylcarbodiimide was dropped, and it was further stirred at 0° C. for 30 minutes.

To the solution dropped was 2 dm³ of tetrahydrofuran being cooled to 0° C. and containing 138 grams of 2,6-dihidroxyaniline gradually. The solution was stirred at room temperature for two days. The reaction solution was condensed and ethyl acetate phase was extracted from 2 normal hydrochloric acid.

The extract was rinsed with hydrochloric acid and saturated sodium chloride solution, and then was dried with sodium sulfate. The product was condensed and purified to produce white solid.

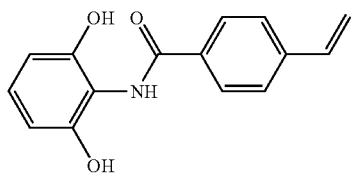

Intermediate VI;
N-(2,6-dihydroxyphenyl)-4-vinyl-benzoic amide

50 Grams of the resulting solid was completely dissolved in 1 dm³ of tetrahydrofuran, and then 46 cm3 of 10M hexane solution of butyl lithium was dropped in the solution under stirring. The solution was condensed and cast on polytetrafluoroethylene sheet. The cast film was dried at room temperature to obtain cast film of 100 µm thick. The cast film was sandwiched between a pair of stainless steel electrodes (SUS304) of 15 mm diameter to prepare a cell for evaluation.

A.C. current of amplitude of 10 mV was applied to the cell at room temperature to measure an A.C. impedance. The range of frequency was from 1 Hz to 1 MHz. An ionic conductivity was determined from an inverse of a bulk resistance obtained from the A.C. impedance.

The ionic conductivity was $1.6 \times 10^{-5}$ Scm$^{-1}$, which was almost the same as that of the solid electrolyte that used polyethylene oxide.

COMPARATIVE EXAMPLE

37 Grams of a copolymer consisting of 20 mole % of ethylene oxide and 2-(2-methoxy) ethylene glycidylether and 6.6 grams of LiPF6 as an electrolyte salt were mixed, and the mixture was dissolved in acetonitrile to prepare a solution. The solution was cast on a polytetrafluoroethylene sheet, and the cast solution film was dried under reduced pressure at 80° C. to obtain a cast film of a thickness of 100 micrometers.

The cast film was sandwiched between electrodes made of stainless steel (SUS 304) each having a diameter of 15 mm to prepare a cell for evaluation. An amplitude voltage of 10 mV was applied to the cell at room temperature to measure a.c. impedance. A frequency range was from 1 Hz to 1 MHz. An ionic conductivity was derived from the reciprocal number of the bulk ohmic value that was obtained from measurement of the a.c. impedance. The ionic conductivity was $5 \times 10^{-5}$ Scm$^{-1}$.

As having been described in Examples and Comparative Example, the solid electrolyte according to the present invention that exhibits ionic conductivity mechanism based on the single bond rotation showed higher ionic conductivity than the conventional solid electrolyte whose conductivity is based on segmental motion of molecular chains.

The polymer of the present invention can be used as an electronic conductive material for connecting unit cells of a fuel cell system, capacitors, etc.

What is claimed is:

1. A lithium battery comprising an active positive material, an active negative material and a solid electrolyte, wherein the electrolyte is a polymer represented by the general formula,

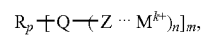

$$R_p + Q + (Z \cdots M^{k+})_n]_m,$$

wherein $R_p$ is a residue of a polymer of a compound having a polymerizable unsaturated bond, Q is an organic residue of n+1 valences and connected through an amide group to $R_p$ by means of a single bond, $M^{k+}$ is a cation of k valence, Z is an organic function group capable of forming an ionic bond with cation $M^{k+}$ or an organic function group having a coordination capability with $M^{k+}$, and m, n and k are integers of one or more.

2. The lithium battery according to claim 1, wherein Q is a six-membered ring, and wherein Z is connected to a carbon atom in the six-membered ring, the carbon atom to which Z is connected being next to the single bond.

3. The lithium battery according to claim 1, wherein $R_p$ is a residue of a copolymer of an aryl compound and another compound.

4. The lithium battery according to claim 1, wherein Q is an aryl group connected through the amide group to $R_p$ by means of a single bond.

5. The lithium battery according to claim 1, wherein Q is a six-membered ring.

6. The lithium battery according to claim 1, wherein $R_p$ is a residue of polystyrene.

7. The lithium battery according to claim 1, wherein the polymer is represented by the formula (2)

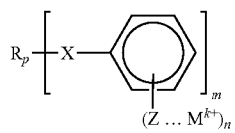
(2)

wherein X is an amide group.

8. The lithium battery according to claim 1, wherein the polymer is represented by the formula (3):

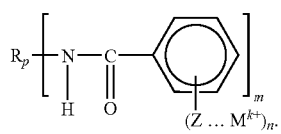
(3)

9. The lithium battery according to claim 1, wherein the polymer is represented by the formula (4):

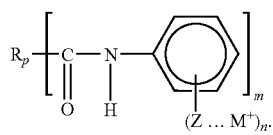
(4)

10. The lithium battery according to claim 1, wherein $R_p$ is a residue of polystyrene, each of the groups $(Q(Z^- \ldots M^{k+})_n)_m$ is pendent from a styrene unit through an amide group, Z is hydroxyl group or methoxy group, and $M^{k+}$ is lithium ion.

11. The lithium battery according to claim 1, wherein said polymer is made from an intermediate of said polymer, which is represented by the general formula:

$$R-[Q-(Z \cdots M^{k+})_n]_m.$$

12. The lithium battery according to claim 11, wherein Q is an organic group of a six-membered ring connected through the amide group by means of a single bond to R.

13. The lithium battery according to claim 11, wherein Q is an aryl group connected through the amide group to R.

14. The lithium battery according to claim 11, wherein R is a residue of styrene.

15. The lithium battery according to claim 12, wherein Z is connected to a carbon atom in the six-membered ring, the carbon atom being next to the single bond.

16. The lithium battery according to claim 11, wherein Q is a six-membered ring connected through the amide group to R.

* * * * *